(12) United States Patent
Ito

(10) Patent No.: US 9,577,334 B2
(45) Date of Patent: Feb. 21, 2017

(54) ANTENNA DEVICE AND ELECTRONIC APPARATUS

(71) Applicant: MURATA MANUFACTURING CO., LTD., Kyoto (JP)

(72) Inventor: Hiromitsu Ito, Nagaokakyo (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 182 days.

(21) Appl. No.: 14/207,335

(22) Filed: Mar. 12, 2014

(65) Prior Publication Data

US 2014/0191916 A1    Jul. 10, 2014

Related U.S. Application Data

(63) Continuation of application No. PCT/JP2012/075907, filed on Oct. 5, 2012.

(30) Foreign Application Priority Data

Oct. 7, 2011    (JP) ................. 2011-222840

(51) Int. Cl.
*H01Q 1/38* (2006.01)
*H01Q 7/06* (2006.01)
(Continued)

(52) U.S. Cl.
CPC .......... *H01Q 7/06* (2013.01); *G06K 19/07771* (2013.01); *H01Q 1/2216* (2013.01); *H01Q 1/38* (2013.01); *H01Q 1/48* (2013.01)

(58) Field of Classification Search
CPC ...................................................... H01Q 7/06
(Continued)

(56) References Cited

U.S. PATENT DOCUMENTS

2007/0052600 A1    3/2007 Kamitani et al.
2012/0091821 A1    4/2012 Kato et al.
(Continued)

FOREIGN PATENT DOCUMENTS

EP         2424041 A1     2/2012
JP     2006-351714 A    12/2006
(Continued)

OTHER PUBLICATIONS

The First Office Action issued by the State Intellectual Property Office of People's Republic of China on Nov. 3, 2014, which corresponds to Chinese Patent Application No. 201280044961.1 and is related to U.S. Appl. No. 14/207,335; with English language translation.

(Continued)

*Primary Examiner* — Dameon E Levi
*Assistant Examiner* — Andrea Lindgren Baltzell
(74) *Attorney, Agent, or Firm* — Studebaker & Brackett PC

(57) ABSTRACT

An antenna device includes an antenna coil, a magnetic core, and a metal member. The antenna coil is mounted on a flexible base. The antenna coil is wound in a loop shape or a spiral shape such that its winding center section is a coil opening section. The magnetic core passes through a slit opening section in the flexible base. The metal member has a rectangular opening. The antenna coil is exposed through the opening in the metal member. A front-side coil conductor is nearer the opening than the magnetic core, and thus a magnetic flux links the front-side coil conductor.

11 Claims, 18 Drawing Sheets

(51) Int. Cl.
　　　*H01Q 1/22*　　(2006.01)
　　　*H01Q 1/48*　　(2006.01)
　　　*G06K 19/077*　(2006.01)

(58) Field of Classification Search
　　　USPC .................................................... 343/788
　　　See application file for complete search history.

(56) References Cited

U.S. PATENT DOCUMENTS

| | | | |
|---|---|---|---|
| 2012/0098711 A1* | 4/2012 | Yosui | G06K 7/10336 343/702 |
| 2012/0262357 A1 | 10/2012 | Kato et al. | |
| 2013/0113662 A1 | 5/2013 | Kato et al. | |
| 2013/0234905 A1 | 9/2013 | Kato et al. | |
| 2013/0300622 A1 | 11/2013 | Kato et al. | |
| 2014/0159974 A1 | 6/2014 | Kato et al. | |
| 2014/0340273 A1 | 11/2014 | Kato et al. | |

FOREIGN PATENT DOCUMENTS

| | | | |
|---|---|---|---|
| JP | 4626413 B2 | 2/2011 | |
| JP | 2011-071814 A | 4/2011 | |
| JP | 4687832 B2 | 5/2011 | |
| WO | 2006/134913 A1 | 12/2006 | |
| WO | 2007/013338 A1 | 2/2007 | |
| WO | 2010/122685 A1 | 10/2010 | |
| WO | 2011/036962 A1 | 3/2011 | |
| WO | WO2011036962 A1 * | 3/2011 | ............... H01Q 1/24 |
| WO | 2011/062238 A1 | 5/2011 | |

OTHER PUBLICATIONS

International Search Report; PCT/JP2012/075907; Dec. 25, 2012.
Written Opinion of International Searching Authority; PCT/JP2012/075907; Dec. 25, 2012.
An Office Action; "Notification of Reason for Rejection," issued by the Japanese Patent Office on May 20, 2014, which corresponds to Japanese Patent Application No. 2013-537566 and is related to U.S. Appl. No. 14/207,335; with English language translation.

\* cited by examiner

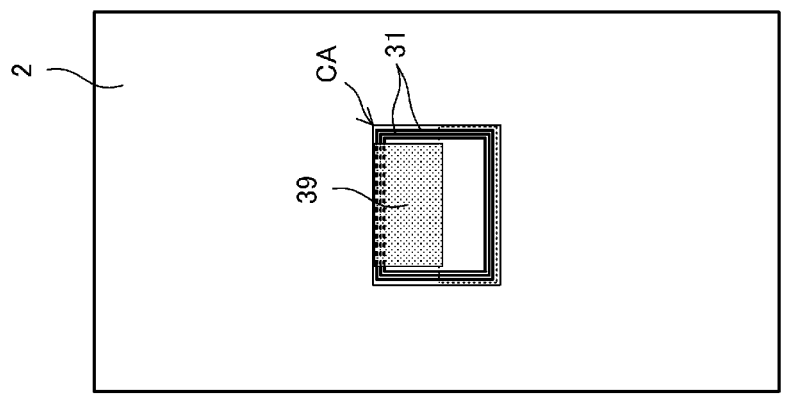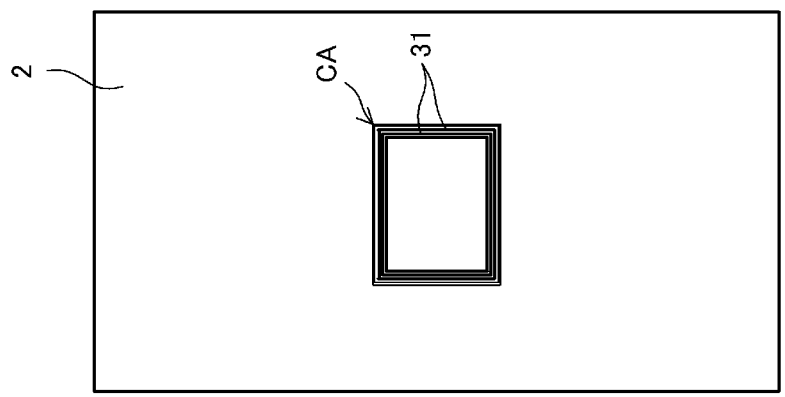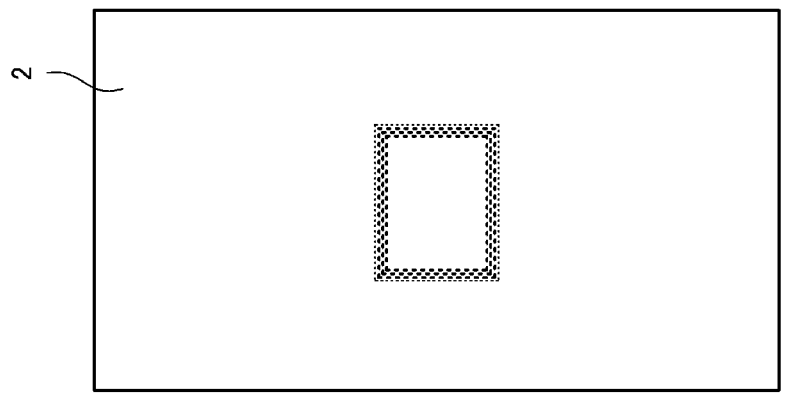

ANTENNA DEVICE AND ELECTRONIC APPARATUS

CROSS REFERENCE TO RELATED APPLICATIONS

This application claims benefit of priority to Japanese Patent Application No. 2011-222840 filed on Oct. 7, 2011, and to International Patent Application No. PCT/JP2012/075907 filed on Oct. 5, 2012, the entire content of each of which is incorporated herein by reference.

TECHNICAL FIELD

The present technical field relates to an antenna device that communicates with another apparatus through electromagnetic-field signals and that is usable in a radio-frequency identification (RFID) system or a near field communication system and to an electronic apparatus including the antenna device.

BACKGROUND

In non-contact communication systems that have become increasingly used in recent years, such as RFID systems or near field communication systems, an antenna for communications is mounted on each apparatus to enable communications between cellular electronic apparatuses, such as cellular phones, or between a cellular electronic apparatus and a reader-writer.

If such an antenna for noncontact communications is implemented on the back side of a metal member, because the metal member blocks magnetic fields, the antenna cannot communicate with an apparatus, such as a reader-writer, positioned opposite the antenna with respect to the metal member.

An antenna device in which an antenna coil is arranged on the back side of a metal member having a conductive opening is disclosed in Japanese Patent No. 4687832.

FIG. 24(A) is a back view of an electronic apparatus that includes the antenna device illustrated in Japanese Patent No. 4687832. The back of the electronic apparatus is a surface directed to an antenna of a reader-writer that is to communicate therewith (that is a communication partner). FIG. 24(B) is a plan view of the inside of a lower casing on the back side.

As illustrated in FIG. 24(A), a conductive layer 22 is disposed on the outer surface of a lower casing 1. One example of the conductive layer 22 can be a metal-evaporated film made of, for example, aluminum. The conductive layer 22 has an opening CA, and further has a slit SL connecting the opening CA and the outer edge. As illustrated in FIG. 24(B), an antenna coil module 3 partially overlapping the opening CA is arranged on the inner surface of the lower casing 1.

As another example, an antenna coil arranged on its end portion of a communication terminal and enabling communications from both the front and back of the communication terminal is disclosed in Japanese Patent No. 4626413.

SUMMARY

Technical Problem

Because the antenna device illustrated in Japanese Patent No. 4687832 needs to have the slit in the metal member, it is not applicable if the metal member has a simple shape. If the metal member having both the opening and the slit is a structural element, an electronic apparatus including the antenna device has a reduced structural strength. If the metal member having both the opening and the slit is a heat dissipating member, its heat dissipating performance may decrease.

The structure of the antenna device illustrated in Japanese Patent No. 4626413 suffers from a low degree of freedom in designing the coil inside the electronic apparatus.

It is an object of the present disclosure to provide an antenna device having a structure in which an antenna coil is arranged on the back side of a metal member, having a small opening required in the metal member, and being capable of stably communicating with a communication partner positioned opposite the antenna device with respect to the metal member and to provide an electronic apparatus including the antenna device.

Solution to Problem

An antenna device according to the present disclosure is an antenna coil including an antenna coil, a magnetic core, and a metal member and in which the antenna coil is wound in a loop shape or a spiral shape along the magnetic core such that a winding center section thereof is a coil opening section, the magnetic core passes through the coil opening section.

The metal member has an opening, and part or all of a portion of the antenna coil is exposed through the opening in the metal member, the portion being nearer the metal member than the magnetic core.

An electronic apparatus according to the present disclosure includes the above-described antenna device including the metal member being part of a casing.

Advantageous Effects of Disclosure

According to the present disclosure, a magnetic flux entering from the opening in the metal member effectively links the antenna coil and strongly couples to an antenna device that is a communication partner. Accordingly, the opening in the metal member can have a reduced size, and the antenna device can stably communicate with the communication partner.

BRIEF DESCRIPTION OF THE DRAWINGS

FIGS. 3(A) and 3(B) illustrate two models of antenna devices used for comparison with the antenna device 101 according to the first embodiment, and FIG. 3(C) illustrates a model used for determining characteristics of the antenna device 101 according to the first embodiment by simulation.

DETAILED DESCRIPTION

First Embodiment

Figure 1:
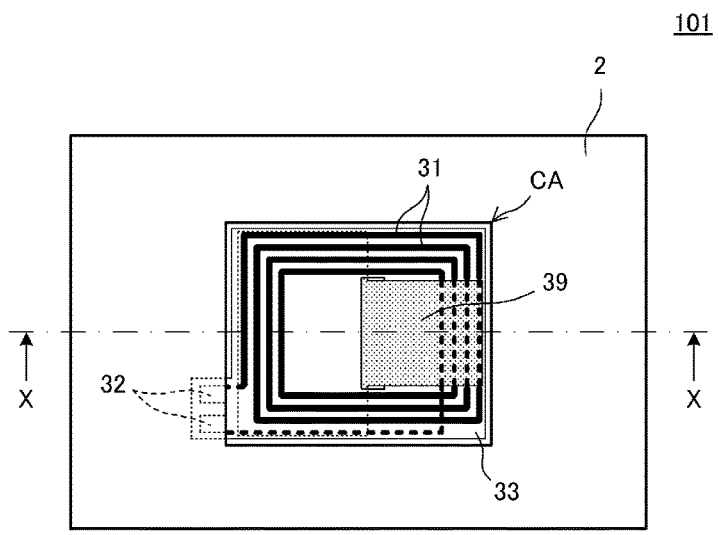
FIG. 1(A) is a plan view of an antenna device 101 according to a first embodiment.
FIG. 1(B) is a cross-sectional view of the portion X-X in FIG. 1(A).
Figure 1:
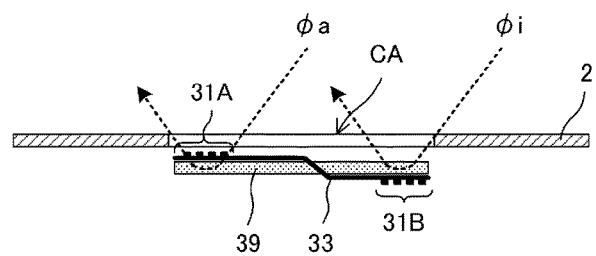
Figure 2:
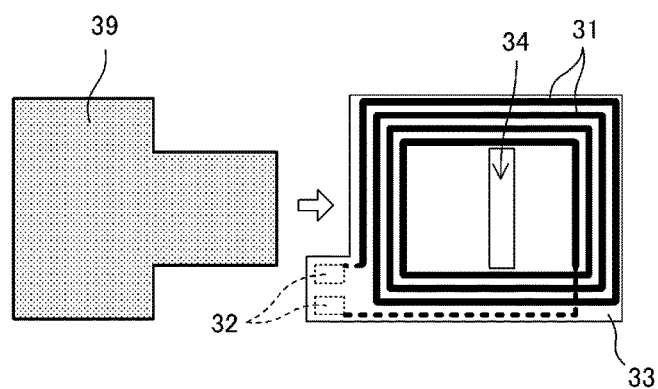
FIG. 2(A) is a plan view of a flexible base 33 provided with an antenna coil 31 and a magnetic core 39.
FIG. 2(B) is a plan view that illustrates a state where the magnetic core 39 is assembled to the flexible base 33.
Figure 2:
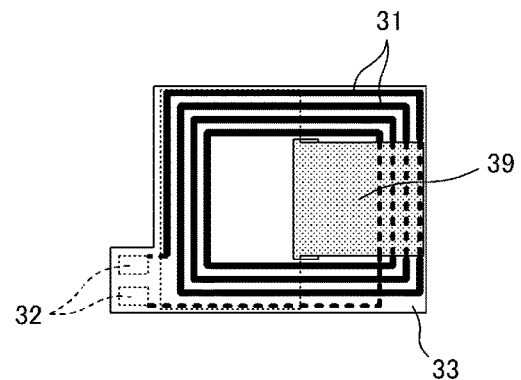

An antenna device 101 according to a first embodiment is described with reference to FIGS. 1 to 4.

FIG. 1(A) is a plan view of the antenna device 101 according to the first embodiment. FIG. 1(B) is a cross-sectional view of the portion X-X in FIG. 1(A). FIGS. 1(A) and 1(B) illustrate a configuration of only a main portion.

FIG. 2(A) is a plan view of a flexible base 33 provided with an antenna coil 31 and a magnetic core 39. FIG. 2(B) is a plan view that illustrates a state where the magnetic core 39 is assembled to the flexible base 33.

The antenna device 101 includes the antenna coil 31, the magnetic core 39, and a metal member 2. The antenna coil 31 is mounted on the flexible base 33. The antenna coil 31 is wound in a loop shape or a spiral shape along the magnetic core 39 such that its winding center section is a coil opening section. Both ends of the antenna coil 31 are extended as connection sections 32.

As illustrated in FIG. 2(A), the flexible base 33 has a slit opening section 34 in the coil opening section. The magnetic core 39 passes through the slit opening section 34.

As illustrated in FIGS. 1(A) and 1(B), the metal member 2 has a rectangular opening CA. The antenna coil 31 is exposed through the opening CA in the metal member 2. In this example, the antenna coil 31 is arranged in the vicinity of the opening CA in the metal member 2 such that the whole of the main portion of the antenna coil 31 is seen through the opening CA. The magnetic core 39 has an outer shape that extends along an inner edge of the metal member 2, the inner edge defining the opening CA.

One example of the flexible base 33 can be a polyimide film. One example of the antenna coil 31 can be a copper foil pattern. One example of the magnetic core 39 can be ferrite shaped in a sheet. One example of the metal member 2 can be an aluminum plate and can be part of the casing of an electronic apparatus or be a frame for heat dissipation.

The antenna coil 31 includes a front-side coil conductor 31A and a back-side coil conductor 31B. The front-side coil conductor 31A is nearer the opening CA in the metal member 2 than the magnetic core 39. The back-side coil conductor 31B is positioned opposite the opening CA in the metal member 2 with respect to the magnetic core 39. The front-side coil conductor 31A and the back-side coil conductor 31B are wound such that they do not overlap each other in plan view.

In FIG. 1(B), the broken-line arrows $\phi a$ and $\phi i$ indicate magnetic fluxes originating from an antenna in a reader-writer that is a communication partner. Because the front-side coil conductor 31A is nearer the opening CA than the magnetic core 39, the magnetic flux $\phi a$ links the front-side coil conductor 31A. In contrast, because the back-side coil conductor 31B is on the back side of the magnetic core 39, the magnetic flux $\phi i$ does not link the back-side coil conductor 31B. Accordingly, magnetic-field communications between the antenna coil 31 and the antenna in the reader-writer being the communication partner are established without being cancelled by both the coupling of the magnetic flux $\phi a$ and that of magnetic flux $\phi i$.

The antenna coil 31 is electrically connected to a circuit board in the electronic apparatus by, for example, a method of connecting connection pins projecting from the circuit board to the connection sections 32.

The circuit board includes a capacitor connected in parallel with the connection sections 32. A resonant frequency is set from the inductance determined from the antenna coil 31 and the magnetic core 39 and the capacitance of the capacitor. For example, when a HF range of the center frequency 13.56 MHz is used, the resonant frequency is set at 13.56 MHz. The resonant frequency when the antenna coil 31 and the magnetic core 39 are not in the vicinity of the metal member 2 is set in advance at a value lower than the center frequency in a used frequency range. When the antenna coil 31 approaches the metal member 2, the inductance value of the antenna coil 31 decreases, and thus the resonant frequency of the antenna device 101 increases. Thus the antenna device 101 may preferably be designed such that in a state where the antenna device 101 is embedded in the electronic apparatus, the resonant frequency of the antenna device 101 is substantially the same as the center frequency in the used frequency range.

FIG. 3(C) illustrates a model used for determining characteristics of the antenna device 101 according to the first embodiment by simulation. The dimensional ratios among the sections in FIG. 3(C) are different from those illustrated in FIGS. 1 and 2. FIGS. 3(A) and 3(B) illustrate two models of antenna devices used for comparison. FIG. 3(B) illustrates an example in which the magnetic core is arranged on the back side of the flexible base provided with the antenna coil having a flat and spiral shape. FIG. 3(A) illustrates an example in which the antenna coil and the magnetic core of the same types illustrated in FIG. 3(B) are included and the metal member 2 does not have the opening CA.

The dimensions of the sections in the above-mentioned models are described below.

Figure 4:
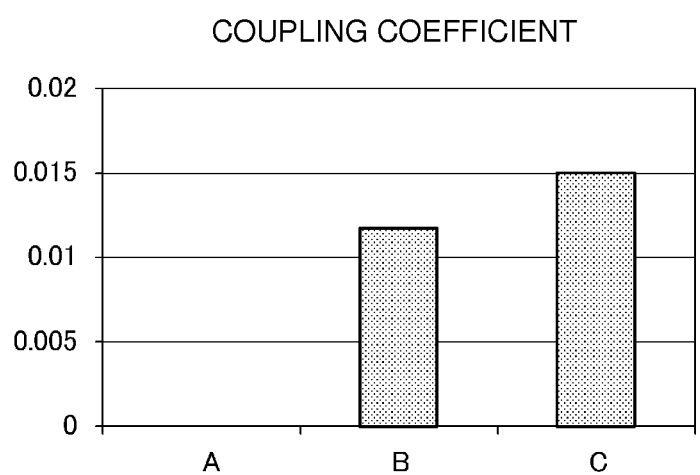
FIG. 4 illustrates coupling coefficients of the antenna devices illustrated in FIGS. 3(A), 3(B), and 3(C).

Size of Opening CA: 25.9 mm×20.1 mm
  Width of Region Where Antenna Coil Is Disposed: 2.9 mm
  Number of Turns of Antenna Coil: 6
  Pitch of Conductive Pattern of Antenna Coil: 0.5 mm (Line Width 0.4 mm, Line Spacing 0.1 mm)
  Outer Size of Antenna Coil: 25.5 mm×19.7 mm
  Outer Size of Magnetic Core: 25.5 mm×19.7 mm
  Spacing between Antenna Coil and Metal Member in Thick Direction: 0.1 mm FIG. 4 illustrates coupling coefficients of the antenna devices illustrated in FIGS. 3(A), 3(B), and 3(C). In FIG. 4, "A" indicates the coupling coefficient of the antenna device illustrated in FIG. 3(A), "B" indicates the coupling coefficient of the antenna device illustrated in FIG. 3(B), and "C" indicates the coupling coefficient of the antenna device according to the first embodiment illustrated in FIG. 3(C). An antenna device that is a communication partner includes a 4-turn antenna coil with a diameter of 70 mm, a coil line width of 1.5 mm, and a line spacing of 0.3 mm. The maximum value of the coupling coefficient was determined from the location spaced away from the metal member 2 by 2.5 mm in a vertical direction and at which the metal member 2 and the antenna coil in the antenna device being the communication partner are parallel to each other.

When the metal member 2 does not have the opening CA, as indicated by "A" in FIG. 4, there is no coupling. In the antenna device illustrated in FIG. 3(B) used for comparison, because the whole of the spiral antenna coil is arranged on the front side of the magnetic core, even when the metal member 2 has the opening CA, magnetic fluxes link the sections of the antenna coil, and thus the couplings are cancelled. That is, both magnetic fluxes corresponding to the magnetic fluxes φa and φi in FIG. 1(B) link the antenna coil, and the couplings are cancelled. Thus a high coupling coefficient is not obtainable, as indicated by "B" in FIG. 4. In contrast to this, with the antenna device according to the first embodiment of the present disclosure, a coupling coefficient higher than that in the antenna device used for comparison illustrated in FIG. 3(B) is obtainable, as indicated by "C" in FIG. 4.

Second Embodiment

An antenna device 102 according to a second embodiment is described with reference to FIGS. 5 to 7.

FIG. 5(A) is a plan view of the antenna device 102 according to the second embodiment. FIG. 5(B) is a cross-sectional view of the portion X-X in FIG. 5(A). FIGS. 5(A) and 5(B) illustrate a configuration of only a main portion.

The antenna device 102 includes the antenna coil 31, the magnetic core 39, and the metal member 2. The antenna coil 31 is mounted on the flexible base 33. The antenna coil 31 is wound in a loop shape or a spiral shape such that its winding center section is a coil opening section.

The configuration of the antenna coil 31, the magnetic core 39, and the metal member 2 is the same as in the first embodiment. The position of each of the antenna coil 31 and the magnetic core 39 with respect to the opening CA in the metal member 2 differs from that in the first embodiment. In the second embodiment, all of the antenna coil 31 and the magnetic core 39 is displaced (moved) in a direction in which the front-side coil conductor 31A in the antenna coil 31 approaches the center of the opening CA. That is, a distance L from the edge of the opening CA in the metal member 2 to the outer edge of the front-side coil conductor 31A is a large value to some extent. The back-side coil conductor 31B in the antenna coil 31 lies outside the opening CA in plan view. That is, the back-side coil conductor 31B is hidden under the metal member 2 in plan view.

Figure 5:
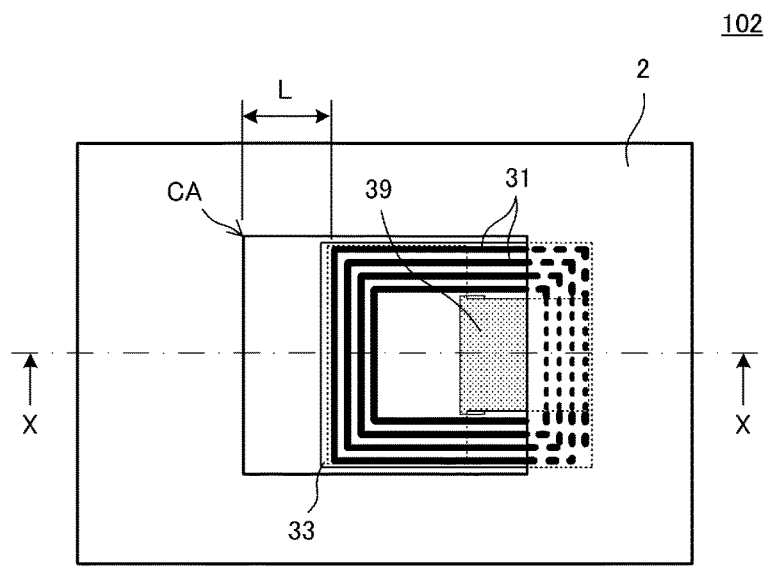
FIG. 5(A) is a plan view of an antenna device 102 according to a second embodiment.
FIG. 5(B) is a cross-sectional view of the portion X-X in FIG. 5(A).
Figure 5:
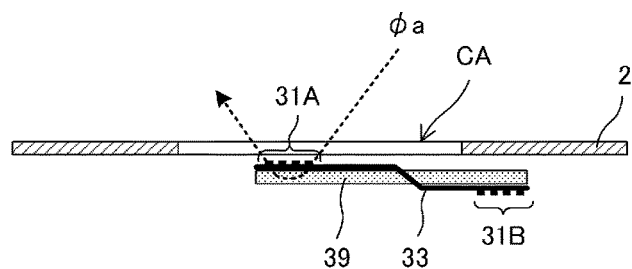
Figure 6:
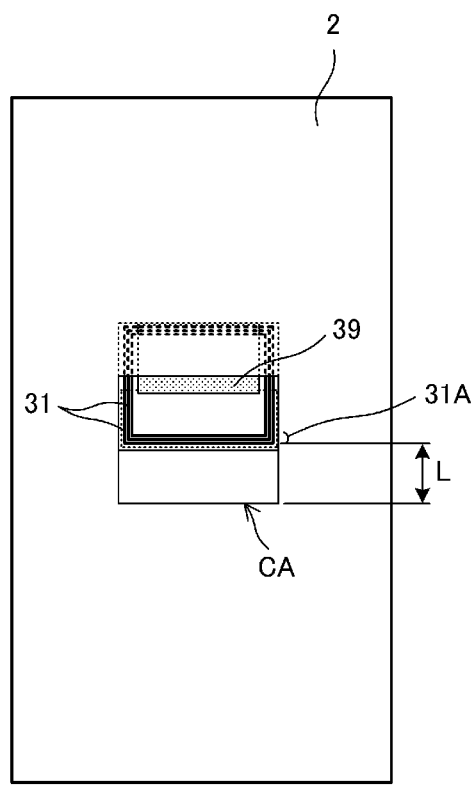
FIG. 6 illustrates a model used for determining characteristics of the antenna device 102 according to the second embodiment by simulation.

FIG. 6 illustrates a model used for determining characteristics of the antenna device 102 according to the second embodiment by simulation. The illustrated dimensional ratios among the sections are different from those illustrated in FIG. 5.

Figure 7:
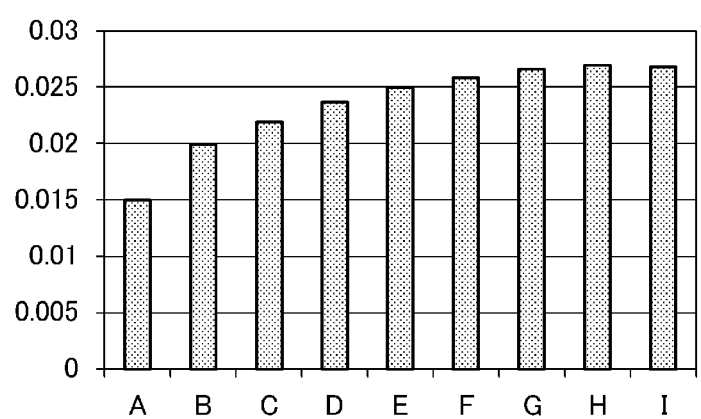
FIG. 7 illustrates how the coupling coefficient changes when a distance L to an outer edge of a front-side coil conductor 31A in the model illustrated in FIG. 6.
Figure 8:
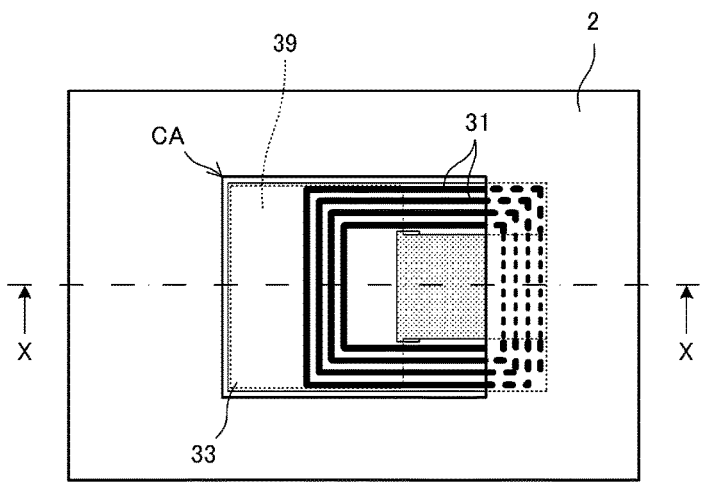
FIG. 8(A) is a plan view of an antenna device 103X according to a third embodiment.
FIG. 8(B) is a cross-sectional view of the portion X-X in FIG. 8(A).
Figure 8:
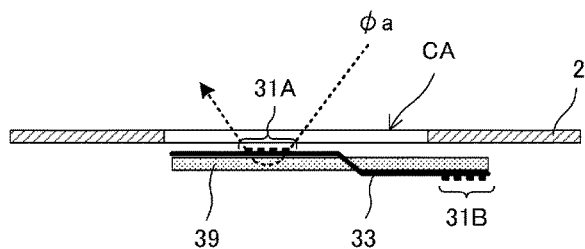

FIG. 7 illustrates how the coupling coefficient changes with variations in the distance L to the outer edge of the front-side coil conductor 31A in the model illustrated in FIG. 6. The conditions used in determining the coupling coefficient are the same as in the first embodiment. The relationship between the distance L and each of A to I in FIG. 7 is described below.

A: L=0 mm
  B: L=1 mm
  C: L=2 mm
  D: L=3 mm
  E: L=4 mm
  F: L=5 mm
  G: L=6 mm
  H: L=7 mm
  I: L=8 mm

When L is 7 mm, the inner edge of the front-side coil conductor 31A is positioned at the center of the opening CA. When L is 8 mm, the front-side coil conductor 31A is positioned at the center of the opening CA.

As is clear from FIG. 7, the coupling coefficient increases as the front-side coil conductor 31A approaches the center of the opening CA in the metal member 2. However, when the inner edge of the front-side coil conductor 31A exceeds the center of the opening CA (in the state for I in FIG. 7), the coupling coefficient tends to reduce. This is because the effects of interfering with linkage of the magnetic flux φa with the front-side coil conductor 31A by a collision of the magnetic flux φa with the metal member 2 decreases with an increase in the distance between the front-side coil conductor 31A and the metal member 2. This reveals that linkage of a magnetic flux to the front-side coil conductor 31A is effective for an antenna in a communication partner and that the arrangement of the front-side coil conductor 31A at the center of the opening CA can reduce the effects of the presence of the metal member 2 and can provide a high coupling coefficient.

Third Embodiment

An antenna device according to a third embodiment is described with reference to FIGS. 8 to 11.

FIG. 8(A) is a plan view of an antenna device 103X according to the third embodiment. FIG. 8(B) is a cross-sectional view of the portion X-X in FIG. 8(A). FIG. 9(A) is a plan view of another antenna device 103Y according to the third embodiment. FIG. 9(B) is a cross-sectional view of the portion X-X in FIG. 9(A).

The antenna device 103X illustrated in FIGS. 8(A) and 8(B) is different in the shape of the magnetic core 39 from the antenna device 102 illustrated in FIG. 5. In the third embodiment, the magnetic core 39 extends to a region defined between the outer edge of a portion of the antenna coil (the front-side coil conductor 31A), the portion being nearer the metal member 2 than the magnetic core 39, and the inner edge of the metal member 2 defining the opening CA.

The antenna device 103Y illustrated in FIGS. 9(A) and 9(B) is configured such that the antenna coil 31 and the magnetic core 39 are present inside the opening CA in the metal member 2 in plan view.

Figure 9:
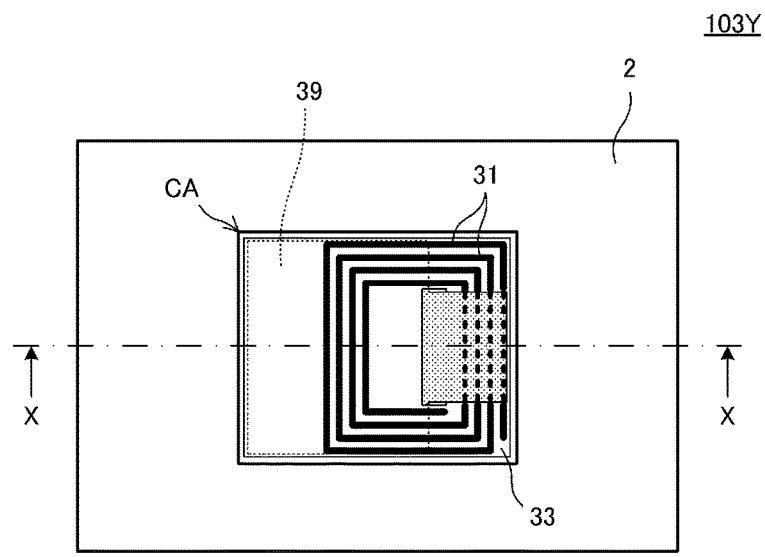
FIG. 9(A) is a plan view of another antenna device 103Y according to the third embodiment.
FIG. 9(B) is a cross-sectional view of the portion X-X in FIG. 9(A).
Figure 9:
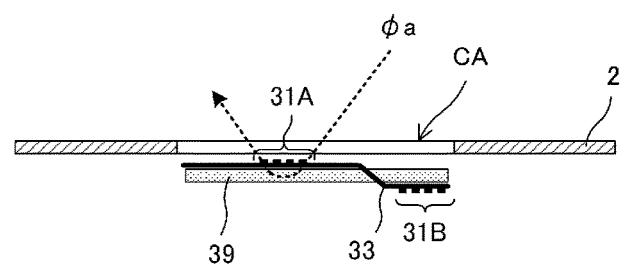
Figure 10A:
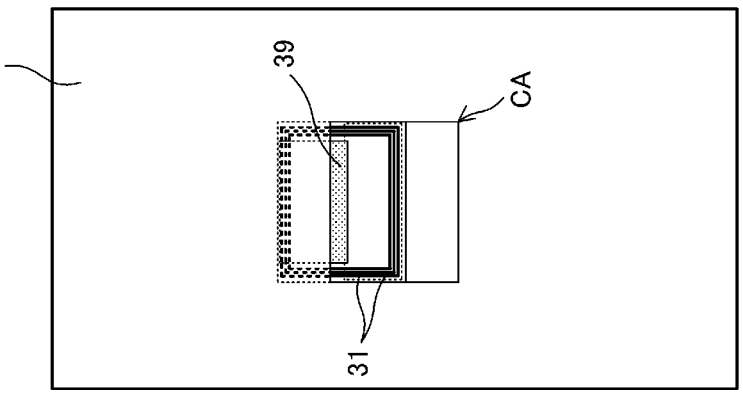
FIG. 10(A) illustrates a model of an antenna device as a comparative example to the antenna device according to the third embodiment.
Figure 10B:
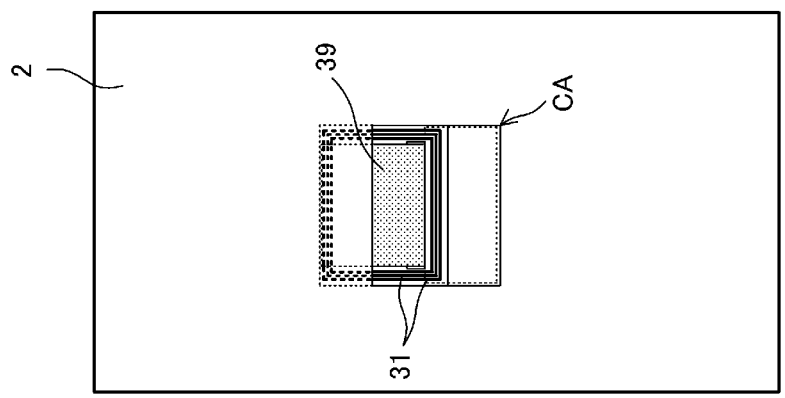
FIGS. 10(B) and 10(C) illustrate models used for determining characteristics of the antenna device according to the third embodiment by simulation.
Figure 10C:
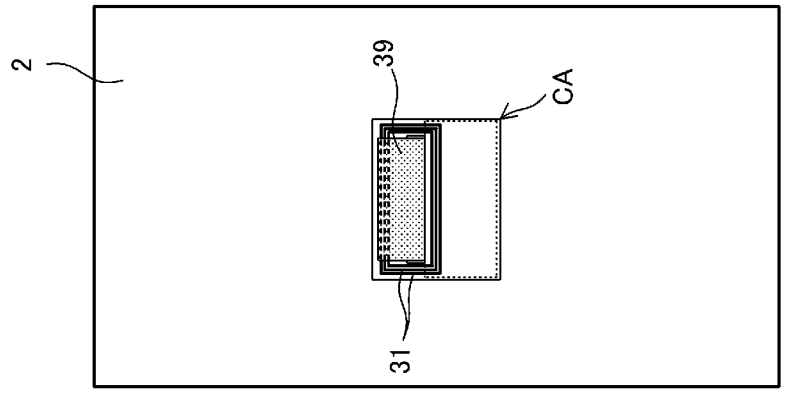

FIGS. 10(B) and 10(C) illustrate models used for determining characteristics of the antenna device according to the third embodiment by simulation. The illustrated dimensional ratios among the sections are different from those illustrated in FIG. 5. FIG. 10(A) illustrates a model of an antenna device as a comparative example, and that model is the antenna device according to the second embodiment illustrated in FIG. 6. FIG. 10(B) illustrates a model of the antenna device illustrated in FIG. 8, and that model is the one in which the magnetic core 39 in the model illustrated in FIG. 10(A) is extended as described above. FIG. 10(C) illustrates a model of the antenna device illustrated in FIG. 9.

Figure 11:
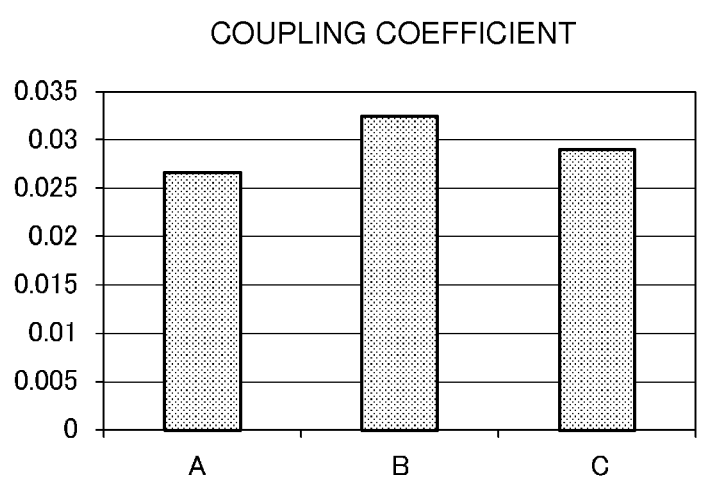
FIG. 11 illustrates coupling coefficients of the models illustrated in FIGS. 10(A), 10(B), and 10(C).

FIG. 11 illustrates coupling coefficients of the models illustrated in FIGS. 10(A), 10(B), and 10(C). The conditions used in determining the coupling coefficients are the same as in the first embodiment.

As is clear from comparison between "A" and "B" in FIG. 11, the coupling coefficient is further increased by the extension of the magnetic core 39 to the region extending to the inner edge of the metal member 2 defining the opening CA. As is clear from comparison between "B" and "C" in FIG. 11, when the back-side coil conductor 31B is exposed to the inside of the opening CA, although the coupling coefficient slightly decreases, the coupling coefficient higher than that of the type illustrated in FIG. 10(A) is obtainable.

Fourth Embodiment

Figure 12:
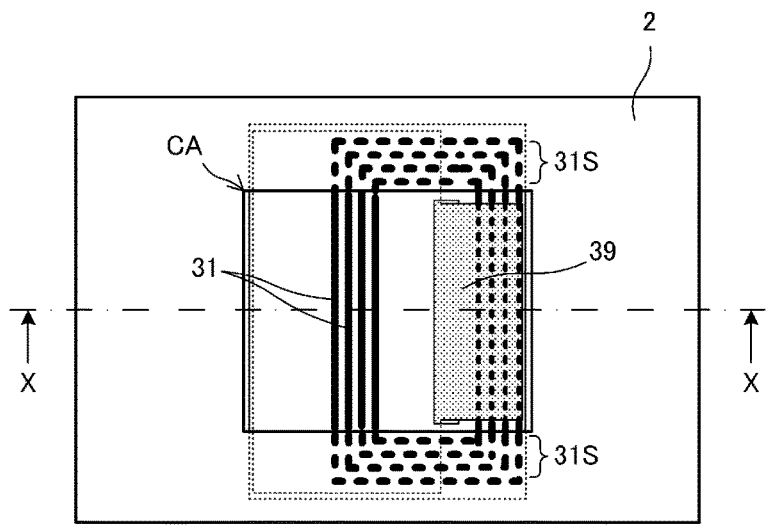
FIG. 12(A) is a plan view of an antenna device 104 according to a fourth embodiment.
FIG. 12(B) is a cross-sectional view of the portion X-X in FIG. 12(A).
Figure 12:
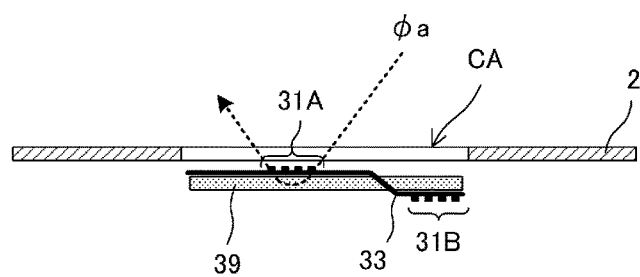
Figure 13:
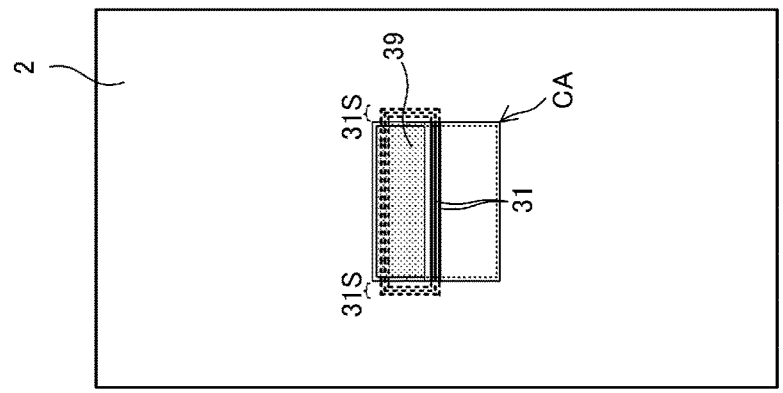
FIG. 13(A) illustrates a model of an antenna device as a comparative example to the antenna device according to the fourth embodiment.
FIGS. 13(B) and 13(C) illustrate models used for determining characteristics of the antenna device according to the fourth embodiment by simulation.
Figure 13:
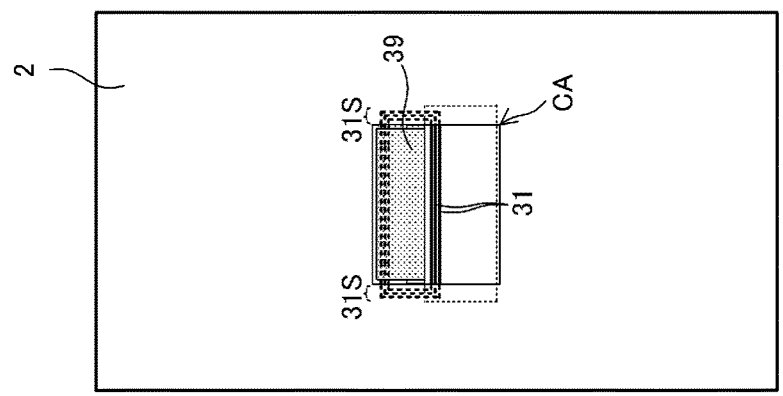
Figure 13:
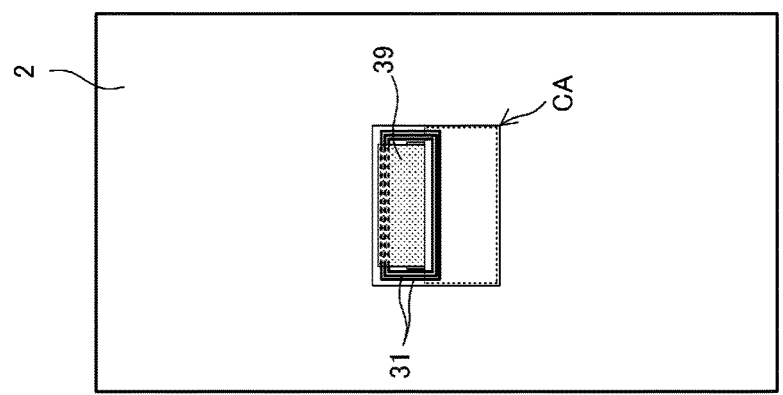

An antenna device according to a fourth embodiment is described with reference to FIGS. 12 to 14.

FIG. 12(A) is a plan view of an antenna device 104 according to the fourth embodiment. FIG. 12(B) is a cross-sectional view of the portion X-X in FIG. 12(A).

The antenna device 104 illustrated in FIGS. 12(A) and 12(B) is different in the dimensions of the antenna coil 31 and the magnetic core 39 from the antenna device 103Y illustrated in FIG. 9. In the antenna device 103Y illustrated in FIG. 9, all of the antenna coil 31 is exposed to the inside of the opening CA in the metal member 2. In the antenna device 104 illustrated in FIG. 12(A), conductive portions 31S in the antenna coil 31 are positioned outside the opening CA. The conductive portions 31S extend in parallel to a direction through which the magnetic core 39 passes (axial direction).

FIGS. 13(B) and 13(C) illustrate models used for determining characteristics of the antenna device according to the fourth embodiment by simulation. FIG. 13(A) illustrates a model of an antenna device as a comparative example, and the model is the same as the antenna device illustrated in FIG. 10(C). FIG. 13(B) illustrates a model of the antenna device 104 illustrated in FIG. 12. FIG. 13(C) illustrates a model of an antenna device in which a portion that protrudes from the edge of the opening CA is removed from the magnetic core 39 in the antenna device illustrated in FIG. 13(B). The dimensions of the sections are described below.

Figure 14:
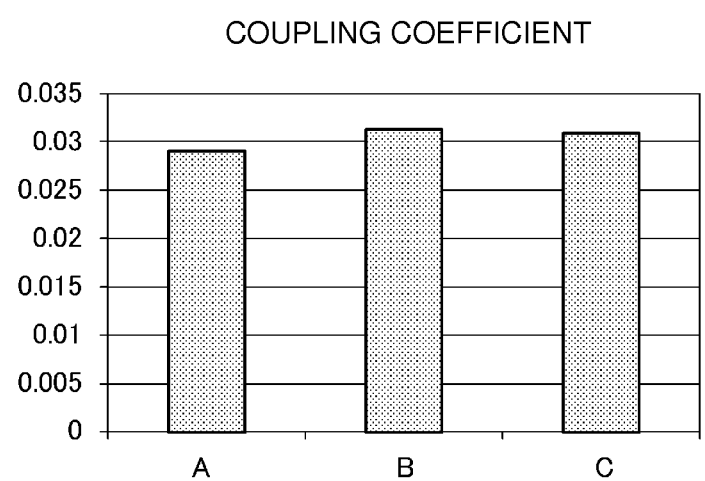
FIG. 14 illustrates coupling coefficients of the models illustrated in FIGS. 13(A), 13(B), and 13(C).

Outer Size of Models in FIGS. 13(B) and 13(C): 31.5 mm×11.3 mm
Outer Size of Magnetic Core 39 in Model in FIG. 13(B): 31.5 mm×19.7 mm
Outer Size of Magnetic Core 39 in Model in FIG. 13(C): 25.3 mm×19.7 mm FIG. 14 illustrates coupling coefficients of the models illustrated in FIGS. 13(A), 13(B), and 13(C). The conditions used in determining the coupling coefficients are the same as in the first embodiment.

As is clear from comparison between "A" and "B" in FIG. 14, the coupling coefficient is further increased by hiding the conductive portions 31S, which are parallel to the direction through which the magnetic core 39 passes (axial direction), under the metal member 2. As is clear from comparison between "B" and "C" in FIG. 14, the removal of the portion protruding from the edge of the opening CA from the magnetic core 39 has little effect on the coupling coefficient.

Fifth Embodiment

Figure 15:
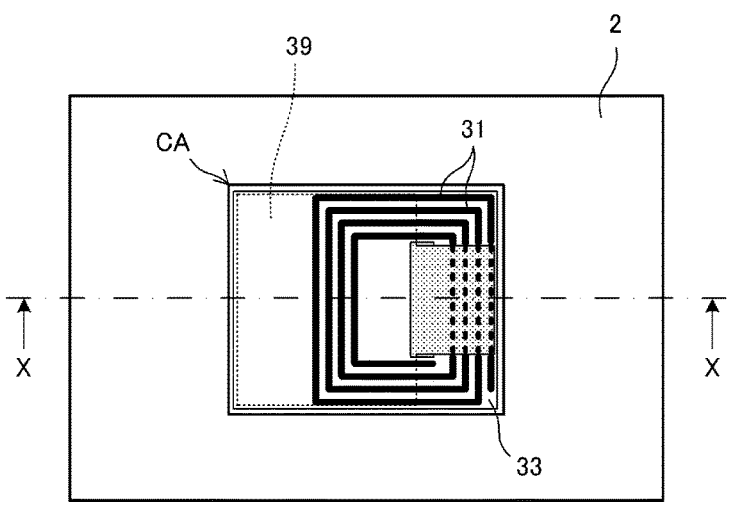
FIG. 15(A) is a plan view of an antenna device 105 according to a fifth embodiment.
FIG. 15(B) is a cross-sectional view of the portion X-X in FIG. 15(A).
Figure 15:
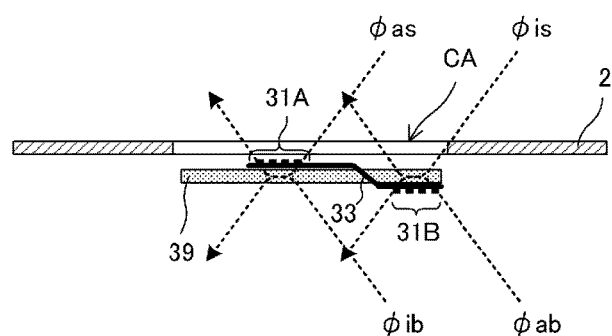

An antenna device having gains in the directions of both sides of the metal member 2 is described in a fifth embodiment. FIG. 15(A) is a plan view of an antenna device 105 according to the fifth embodiment. FIG. 15(B) is a cross-sectional view of the portion X-X in FIG. 15(A). The antenna device has the same basic configuration as in the antenna device 103Y illustrated in FIG. 9. The fifth embodiment explicitly illustrates that a metal member (including a printed board and the like) different from the metal member 2 is not disposed on a surface of each of the antenna coil 31 and the magnetic core 39 opposite the metal member 2.

In FIG. 15(B), the broken line arrows φas and φis indicate magnetic fluxes entering through the opening CA among magnetic fluxes originating from an antenna in a reader-writer that is a communication partner. The broken line arrows φab and φib indicate magnetic fluxes entering from the back side among the magnetic fluxes originating from the antenna in the reader-writer that is the communication partner.

Because the front-side coil conductor 31A is nearer the opening CA than the magnetic core 39, the magnetic flux φas links the front-side coil conductor 31A. In contrast, because the back-side coil conductor 31B is on the back side of the magnetic core 39, the magnetic flux φis does not link the back-side coil conductor 31B. Accordingly, the antenna coil 31 is magnetic-field coupled to the antenna in the reader-writer that is the communication partner using the magnetic flux entering through the opening CA.

Because the back-side coil conductor 31B is on the back side of the magnetic core 39 when seen from the back side of the antenna coil, the magnetic flux φab, which enters from the back side, links the back-side coil conductor 31B. In contrast, because the front-side coil conductor 31A is on the front side of the magnetic core 39 when seen from the back side of the antenna coil, the magnetic flux φib does not link the front-side coil conductor 31A. Accordingly, the antenna coil 31 is magnetic-field coupled to the antenna in the reader-writer that is the communication partner using the magnetic flux entering from the back side.

As described above, the nonexistence of a metal member (including a printed board and the like) that is different from the metal member 2 and that is disposed on a surface of each of the antenna coil 31 and the magnetic core 39 opposite the metal member 2 enables the antenna device to couple to magnetic fluxes entering from both sides of the antenna coil. Accordingly, the antenna device 105 can communicate with the reader-writer that is the communication partner from both sides of the antenna device 105.

Sixth Embodiment

Figure 16:
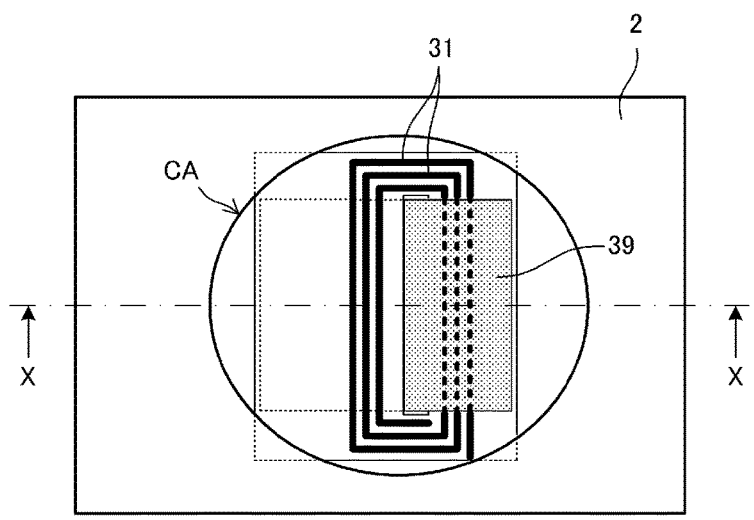
FIG. 16(A) is a plan view of an antenna device 106 according to a sixth embodiment.
FIG. 16(B) is a cross-sectional view of the portion X-X in FIG. 16(A).
Figure 16:
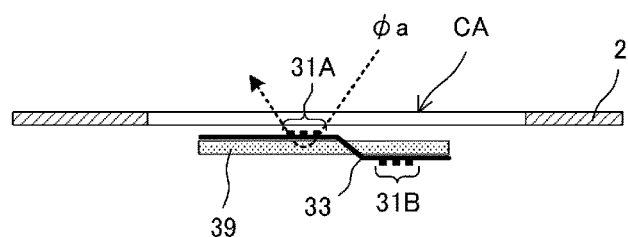

FIG. 16(A) is a plan view of an antenna device 106 according to a sixth embodiment. FIG. 16(B) is a cross-sectional view of the portion X-X in FIG. 16(A). Unlike the antenna devices illustrated in the above-described embodiments, the opening CA in the metal member 2 included in the antenna device 106 is not rectangular. In this example, the opening CA is oval. The opening CA may be any window that allows magnetic fluxes to pass therethrough. Thus the opening CA may be non-rectangular, as described above.

Seventh Embodiment

Figure 17:
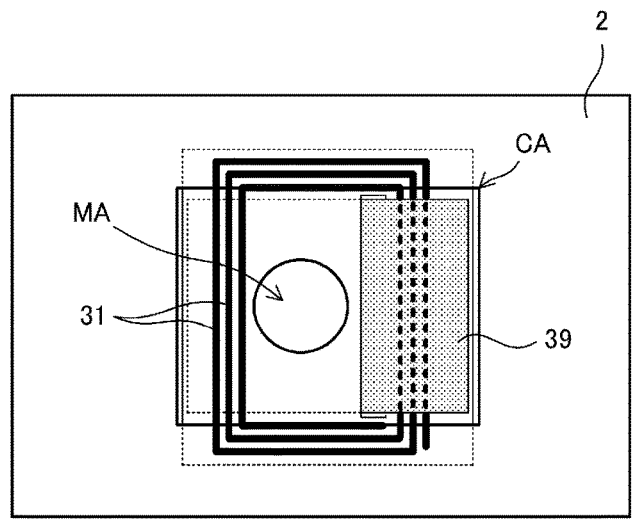
FIG. 17 is a plan view of an antenna device 107 according to a seventh embodiment.

FIG. 17 is a plan view of an antenna device 107 according to a seventh embodiment. Unlike the antenna devices illustrated in the above-described embodiments, the magnetic core 39 included in the antenna device 107 has an opening section MA. This structure is effective when a camera module (not illustrated) is incorporated in a casing of an electronic apparatus and a lens of the camera module is exposed through the opening CA in the metal member 2. That is, the opening section MA in the magnetic core 39 can be used as a window for use in picking up images by the camera module or as a sleeve that receives the lens of the camera module.

Eighth Embodiment

Figure 18:
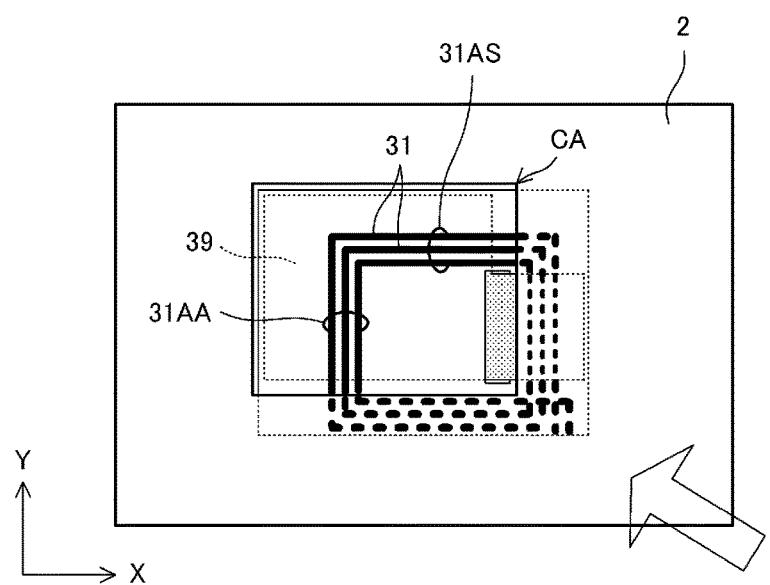
FIG. 18 is a plan view of an antenna device 108A according to an eighth embodiment.

FIG. 18 is a plan view of an antenna device 108A according to an eighth embodiment. Unlike the antenna devices illustrated in the above-described embodiments, the opening CA in the metal member 2 has two perpendicular axes (X axis and Y axis) in the planar direction in the opening plane, and the winding center of the antenna coil 31 included in the antenna device 108A is displaced from the center of the opening CA along both of the two axes (X axis and Y axis). In the antenna device 108A, in plan view, a conductive portion opposed to one portion 31AS of the conductive portions parallel to the direction through which the magnetic core 39 passes (axial direction) and a conductive portion opposed to one portion 31AA of the conductive portions perpendicular to the direction through which the magnetic core 39 passes (axial direction) are hidden under the metal member 2.

Thus, both the conductive portion 31AA and the conductive portions 31AS in the antenna coil 31 act as a magnetic-flux effective linkage section. As a result, the directivity direction of the antenna is inclined from the X axis, and the antenna directivity is the direction indicated by the arrow illustrated in FIG. 18. In such a way, the directivity is also controllable by the direction in which the antenna coil 31 is displaced.

Figure 19:
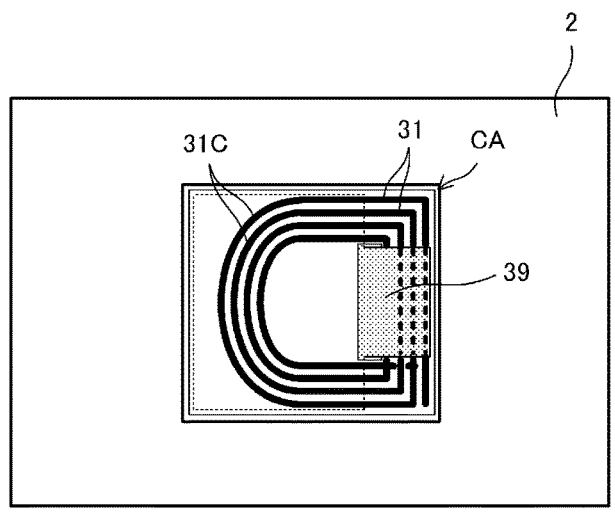
FIG. 19 is a plan view of another antenna device 108B according to the eighth embodiment.

FIG. 19 is a plan view of another antenna device 108B according to the eighth embodiment. Unlike the antenna devices illustrated in the above-described embodiments, the antenna coil 31 included in the antenna device 108B includes a curved section 31C inside the opening CA when seen in a direction perpendicular to the opening CA in the metal member 2 (in plan view). The curved section 31C is parallel to none of the sides of the opening CA.

When the antenna coil 31 includes a portion acting as the magnetic-flux effective linkage section, part or all of the antenna coil 31 may be a curved section.

Ninth Embodiment

A ninth embodiment illustrates a structure of installing an antenna device in an electronic apparatus and a configuration of the electronic apparatus.

Figure 20:
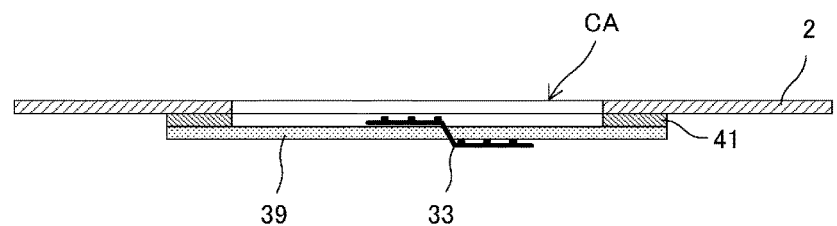
FIG. 20 is a cross-sectional view of a portion where an antenna device is disposed in an electronic apparatus according to a ninth embodiment.
Figure 21:
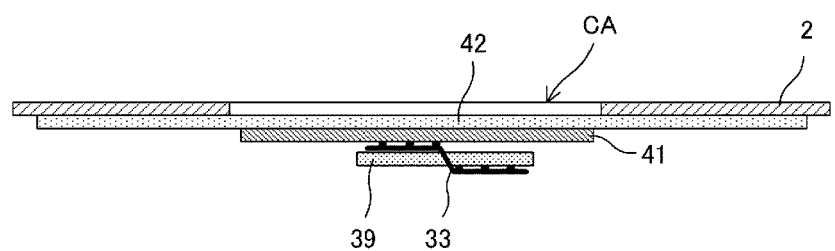
FIG. 21 is a cross-sectional view of a portion where an antenna device is disposed in another electronic apparatus according to the ninth embodiment.

FIGS. 20 and 21 are cross-sectional views each illustrating a portion where an antenna device is disposed in an electronic apparatus. In the example illustrated in FIG. 20, the outer peripheral section in the magnetic core 39 is attached to the outer peripheral section in the opening CA in the metal member 2 with an adhesive (e.g., double-faced tape) 41 disposed therebetween. In the example illustrated in FIG. 21, an antenna module that includes the flexible base 33 provided with the antenna coil and the magnetic core 39 is attached to a resin sheet material 42 with the adhesive (e.g., double-faced tape) 41 disposed therebetween, and the resin sheet material 42 is attached to the surrounding areas of the opening CA in the metal member 2.

In such a way, components including the metal member 2 may be integrated.

Tenth Embodiment

A tenth embodiment illustrates a structure of installing an antenna device with the metal member 2 being not integrated and a configuration of an electronic apparatus including the antenna device.

Figure 22:
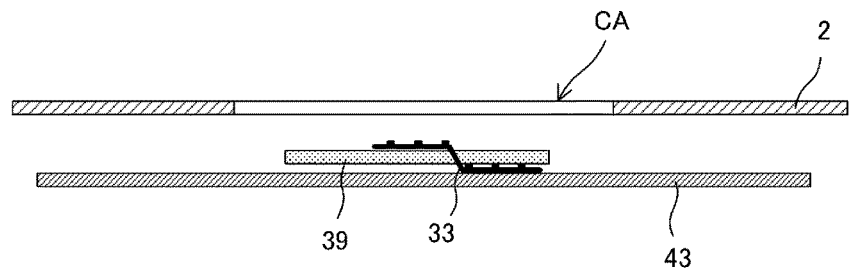
FIG. 22 is a cross-sectional view of a portion where an antenna device is disposed in an electronic apparatus according to a tenth embodiment.

FIG. 22 is a cross-sectional view of a portion where the antenna device is disposed in the electronic apparatus. In this example, an antenna main unit that includes the flexible base 33 provided with the antenna coil and the magnetic core 39 is mounted on a printed circuit board 43, which is a metal member different from the metal member 2. The metal member 2 is part of the casing of the electronic apparatus. The antenna main unit is opposed to the opening CA by placement of the printed circuit board 43 in that casing.

In such a way, the metal member 2 and the antenna main unit may be separated.

The antenna main unit may be mounted on an element other than the printed circuit board. For example, the antenna main unit may be arranged on a support on the printed circuit board.

Eleventh Embodiment

An eleventh embodiment illustrates a special structure of supplying power to the antenna coil 31 and a configuration of an electronic apparatus including the antenna device.

Figure 23:
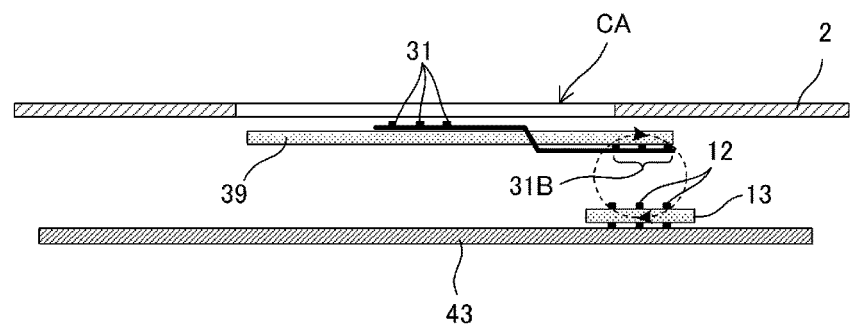
FIG. 23 is a cross-sectional view of a portion where an antenna device is disposed in an electronic apparatus according to an eleventh embodiment.
Figure 24:
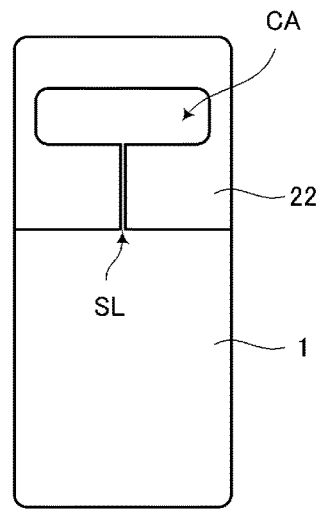
FIG. 24(A) is a back view of an electronic apparatus including an antenna device in Japanese Patent No. 4687832.
FIG. 24(B) is a plan view of the inside of a lower casing of the electronic apparatus on the back side.
Figure 24:
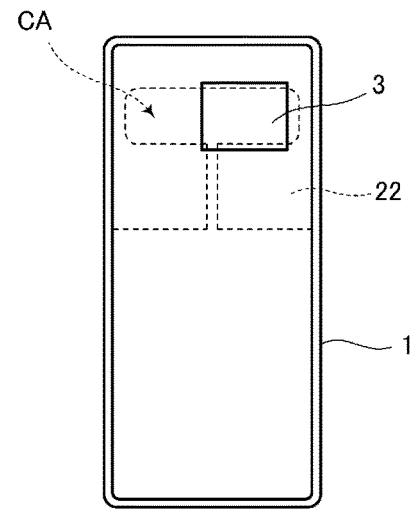

FIG. 23 is a cross-sectional view of a portion where the antenna device is disposed in the electronic apparatus. In FIG. 23, a feed module that includes a magnetic core 13 and an excitation coil 12 is mounted on the printed circuit board 43. The excitation coil 12 is wound around the magnetic core 13 in a direction in which its winding axis is the horizontal directions in FIG. 23. The magnetic core 13 in the feed module is in the vicinity of the back-side coil conductor 31B in the antenna coil 31 and is electromagnetic-field (mainly magnetic-field) coupled thereto.

The antenna coil 31 has substantially the same basic configuration as that of the antenna coil in any of the antenna devices described above. The antenna coil 31 does not include the connection sections 32 and forms a closed loop. The antenna coil 31 constitutes an LC parallel resonant circuit. A capacitance component of the LC parallel resonant circuit is a capacitance occurring in the conductive pattern of the antenna coil. In addition to the antenna coil 31, an electrode for forming a capacitance may be included as necessary.

Other Embodiments

The metal member (metal member 2) according to the present disclosure is not limited to a metal plate. For example, if part of an outer surface of a casing is metallic for design consideration, a metal film is formed on the outer surface of the casing by, for example, vapor deposition, and that metal film may be used as the metal member.

The number of turns of the antenna coil 31 can be determined from the outer size and necessary inductance. When the number of turns is one, the antenna coil 31 is a simple loop coil conductor.

The invention claimed is:

1. An antenna device comprising:
an antenna coil;
a magnetic core; and
a metal member,
the antenna coil being wound in a loop shape or a spiral shape along the magnetic core such that a winding center section thereof is a coil opening section,
the magnetic core passing through the coil opening section,
the antenna coil being positioned opposite to a communication partner side with respect to the metal member,
the metal member having an opening whose inner edge is closed,
the opening is surrounded by the metal member, and
part or all of a portion of the antenna coil being exposed through the opening in the metal member, the portion being nearer to the metal member than the magnetic core is near to the metal member.

2. An antenna device comprising:
an antenna coil;
a magnetic core; and
a metal member,
the antenna coil being wound in a loop shape or a spiral shape along the magnetic core such that a winding center section thereof is a coil opening section,
the magnetic core passing through the coil opening section,
the antenna coil being positioned opposite to a communication partner side with respect to the metal member,
the metal member having an opening being surrounded by the metal member, and
part or all of a portion of the antenna coil being exposed through the opening in the metal member, the portion being nearer to the metal member than the magnetic core is near to the metal member,
when seen in a direction perpendicular to the opening in the metal member, the winding center section of the antenna coil is displaced from a center of the opening in the metal member in a direction in which the portion of the antenna coil approaches the center of the opening.

3. The antenna device according to claim 1, wherein the magnetic core has an outer shape extending along the opening in the metal member.

4. The antenna device according to claim 2, wherein, when seen in a direction perpendicular to the opening in the metal member, the magnetic core extends to a region defined between an outer edge of the portion of the antenna coil being nearer the metal member than the magnetic core and an inner edge of the metal member, the inner edge defining the opening.

5. An antenna device comprising:
an antenna coil;
a magnetic core; and
a metal member,
the antenna coil being wound in a loop shape or a spiral shape along the magnetic core such that a winding center section thereof is a coil opening section,
the magnetic core passing through the coil opening section,
the antenna coil being positioned opposite to a communication partner side with respect to the metal member,
the metal member having an opening being surrounded by the metal member, and
part or all of a portion of the antenna coil being exposed through the opening in the metal member, the portion being nearer to the metal member than the magnetic core is near to the metal member,
wherein a portion of the antenna coil, the portion being parallel to a direction through which the magnetic core passes, is positioned outside the opening when seen in a direction perpendicular to the opening in the metal member.

6. The antenna device according to claim 1, wherein another metal member, different from the metal member, is not disposed on a surface of each of the antenna coil and the magnetic core, the surface being opposite the metal member.

7. The antenna device according to claim 1, wherein the magnetic core has a hole inside the coil opening section when seen from a direction perpendicular to the opening in the metal member.

8. The antenna device according to claim 1, wherein the antenna coil includes a curved section that overlaps the opening in the metal member when seen from a direction perpendicular to the opening in the metal member.

9. The antenna device according to claim 1, wherein the opening in the metal member has two perpendicular axes in a planar direction of the opening, and the winding center section of the antenna coil is displaced from the center of the opening along both the two axes when seen in a direction perpendicular to the opening in the metal member.

10. An antenna device comprising:
an antenna coil;
a magnetic core;
a metal member; and
an excitation coil,
the antenna coil being wound in a loop shape or a spiral shape along the magnetic core such that a winding center section thereof is a coil opening section,
the magnetic core passing through the coil opening section,
the antenna coil being positioned opposite to a communication partner side with respect to the metal member,
the metal member having an opening being surrounded by the metal member, part or all of a portion of the antenna coil being exposed through the opening in the metal member, the portion being nearer to the metal member than the magnetic core is near to the metal member, and the excitation coil being different from an antenna coil in a reader-writer electromagnetic-field coupled to the antenna coil of the antenna device, wherein the antenna coil constitutes at least part of a resonant circuit.

11. An electronic apparatus comprising:

an antenna device; and a communication apparatus, wherein the antenna device comprising:

an antenna coil;

a magnetic core; and a metal member, the antenna coil being would in a loop shape or a spiral shape along the magnetic core such that a winding center section thereof is a coil opening section, the magnetic core passing through the coil opening section, the antenna coil being positioned opposite to a communication partner side with respect to the metal member, the metal member having an opening being surrounded by the metal member, and part or all of a portion of the antenna coil being exposed through the opening in the metal member, the portion being nearer to the metal member than the magnetic core is near to the metal member, wherein the metal member is part of a casing.

* * * * *